INVENTOR.
W.D. HAILES
BY
Forest B. Hitchcock
HIS ATTORNEY

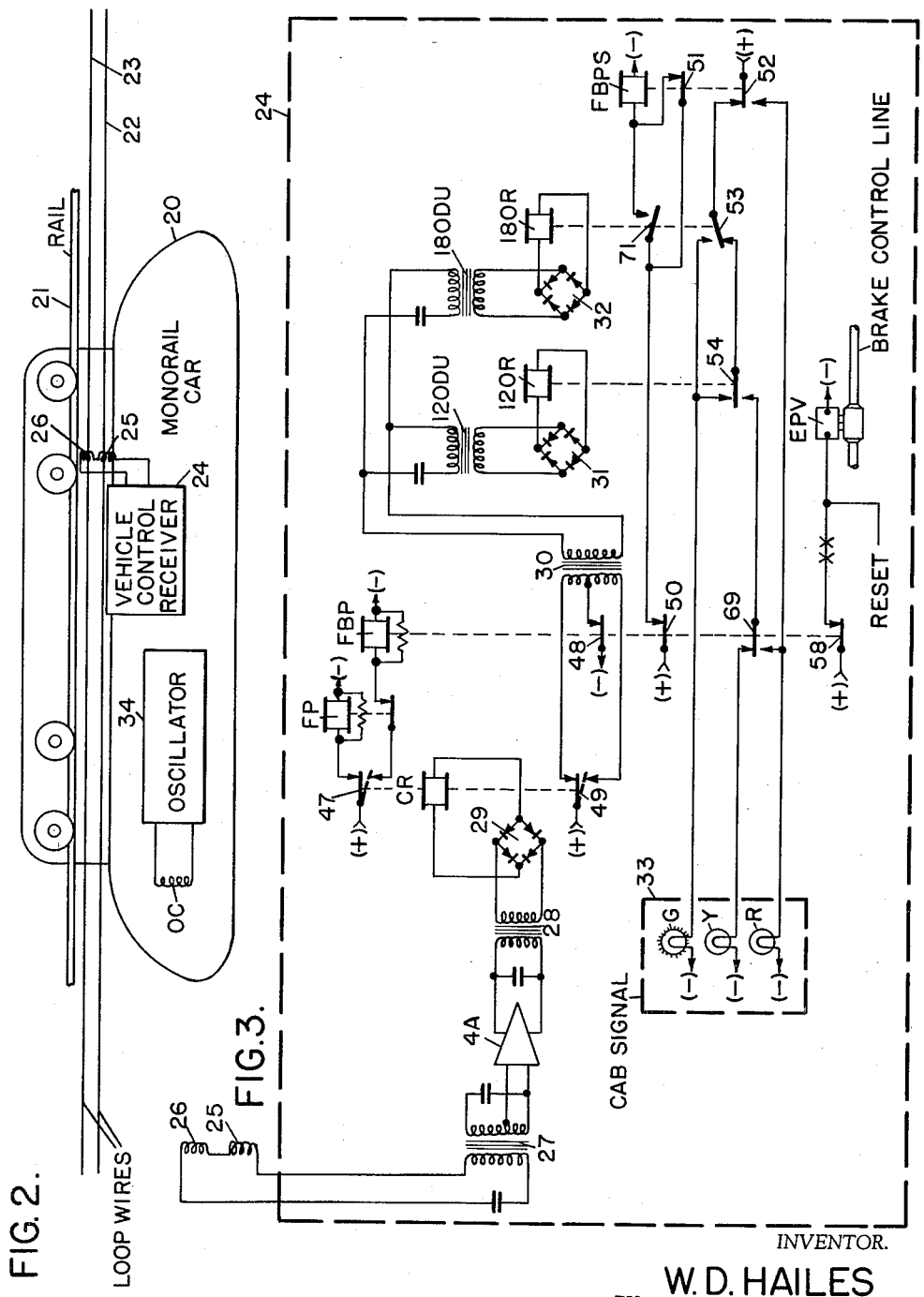

July 17, 1962  W. D. HAILES  3,045,112
VEHICLE CONTROL SYSTEM
Filed June 15, 1959  4 Sheets-Sheet 3
FIG. 4A.
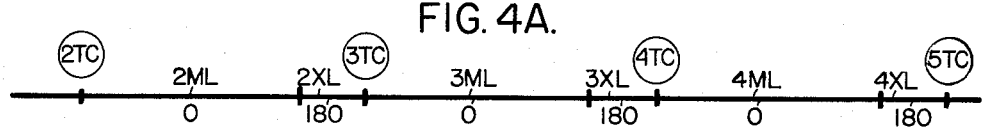
FIG. 4B.
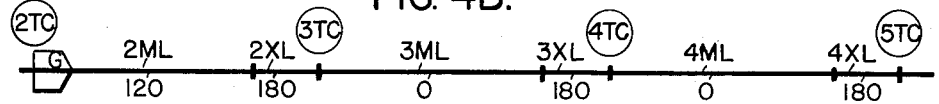
FIG. 5A.
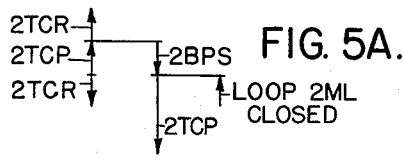
FIG. 4C.
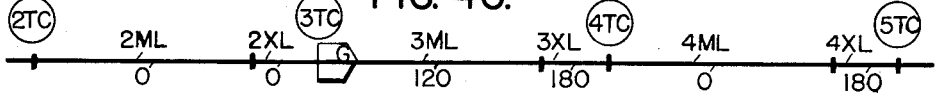
FIG. 5B.
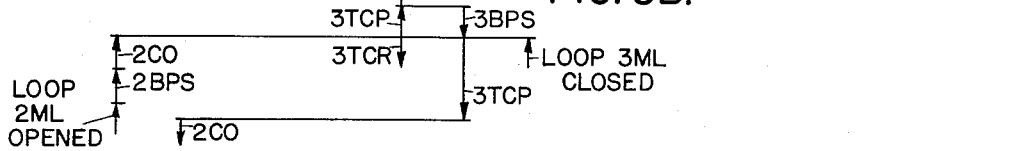
FIG. 4D.
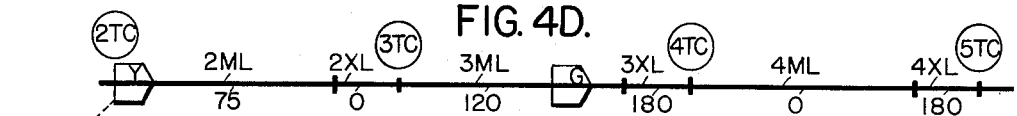
FIG. 5C.
FIG. 4E.
FIG. 5D.
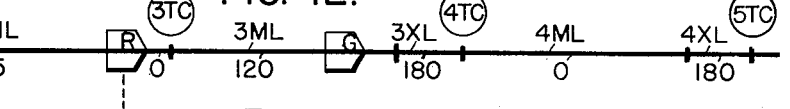
SIGNAL CHANGES FROM
YELLOW TO RED
FIG. 4F.
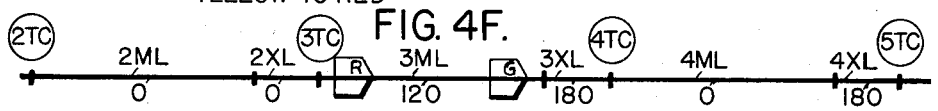
INVENTOR.
W. D. HAILES
BY Forest B. Hitchcock
HIS ATTORNEY July 17, 1962 W. D. HAILES 3,045,112
VEHICLE CONTROL SYSTEM
Filed June 15, 1959 4 Sheets-Sheet 4

INVENTOR.
W. D. HAILES
BY
Forest B. Hitchcock
HIS ATTORNEY

United States Patent Office 3,045,112
Patented July 17, 1962

1

3,045,112
VEHICLE CONTROL SYSTEM
William D. Hailes, Rochester, N.Y., assignor to General Railway Signal Company, Rochester, N.Y.
Filed June 15, 1959, Ser. No. 820,386
14 Claims. (Cl. 246—63)

This invention relates to vehicle control systems, and it more particularly pertains to the continuous control of vehicles and/or the continuous control of vehicle carried cab signals without the use of track circuits.

In train control systems of the continuous inductive type, alternating current train control codes are transmitted through the rails for the control of trains, and/or the control of cab signals. These codes are received inductively on the locomotive by receiving coils on the front of the trains. The shunting of the track rails serves as a means for providing restrictive control of a following train and also prevents the code from feeding under the train to a following train that may have entered the same block. Under conditions where there are no track rails to be shunted, as on a monorail railroad, or where the shunt cannot be relied upon, the conventional continuous train control system cannot be employed.

The vehicle control system according to the present invention has utility particularly as it does not rely upon a track shunt and can therefore be employed, for example, for continuous vehicle control and/or the control of cab signals for a monorail railroad, and for the control of light cars such as mining cars and the like. The system provided by the present invention can also be used for the control of vehicles on practically any right of way, such as on a superhighway or thruway.

Without attempting to define the scope of the present invention, the system according to the present invention provides that a right of way is divided into a succession of adjoining blocks. Each of the blocks comprises a main loop circuit extending along the right of way and disposed to be inductively coupled with vehicle carried receiving apparatus, and a relatively short exit loop circuit. The main and exit loops are selectively energized with coded alternating current transmitted through the loops. The exit loops serve to prevent a following train from receiving the coding of a preceding train in case of double occupancy of a block, and to provide a means for resetting a vehicle carried normally energized stick circuit after a condition of double occupancy of a block.

Wayside coils are provided at the adjoining ends of the blocks for cooperating inductively with coils carried by vehicles passing over the right of way. These coils are used for indicating movement of vehicles into the respective blocks. Because of the system being proposed for use with individually driven vehicles or short trains, the checking into one block and the checking out of the preceding block is accomplished substantially at the same time by intermittent inductive coupling of wayside and vehicle carried coils. Thus no separate "check-in" and "check-in" coils are required. If the coils carried by the vehicles are energized by suitable oscillators at a predetermined frequency, the wayside coils are inert and are all tuned to this frequency. The inert coils could be carried by the vehicles, and the wayside coils could be energized by oscillators at a predetermined frequency.

The coils are used to register occupancy of the blocks. The system is made fail-safe in that a vehicle must properly check into a block before a proceed or a proceed with caution control for the vehicle can be transmitted through the main loop of that block. The rear end of a train is protected in case of failure to check into a block because the loops in the next two blocks in the rear cannot be energized to provide a proceed indication under these conditions.

2

An object of the present invention is to provide continuous vehicle control by selectively energizing loop circuits extending along a right of way which are not subject to shunting by a vehicle.

Another object of the present invention is to provide continuous control of vehicle carried cab signals by selectively energizing loop circuits extending along a right of way which are not subject to shunting by a vehicle.

Another object of the present invention is to provide a safe continuous inductive vehicle control system wherein control codes are conveyed to the vehicles by loop circuits along the right of way which are not subject to shunting by a vehicle.

Another object of the present invention is to select codes applied to loop circuits in accordance with the actuation of intermittent inductive means partly on the trains and partly at the ends of the blocks.

Another object of the present invention is to check the integrity of the operation of the intermittently operated inductive means.

Other objects, purposes and characteristic features of the present invention will be in part obvious from the accompanying drawings and in part pointed out as the description of the invention progresses.

In describing the invention in detail, reference is made to the accompanying drawings in which similar letter reference characters are used to designate apparatus having similar features and functions and in which:

FIG. 2 illustrates a monorail car equipped with vehicle carried train control apparatus operable in cooperation with the right of way apparatus of FIG. 1;

FIG. 3 illustrates vehicle carried train control circuits;

FIGS. 4A, 4B, 4C, 4D, 4E and 4F are diagrams illustrating the condition of energization of the various loop circuits along a typical right of way;

FIGS. 5A, 5B, 5C and 5D are sequence charts illustrating the sequence of operation of the apparatus under typical traffic conditions;

Figure 1:
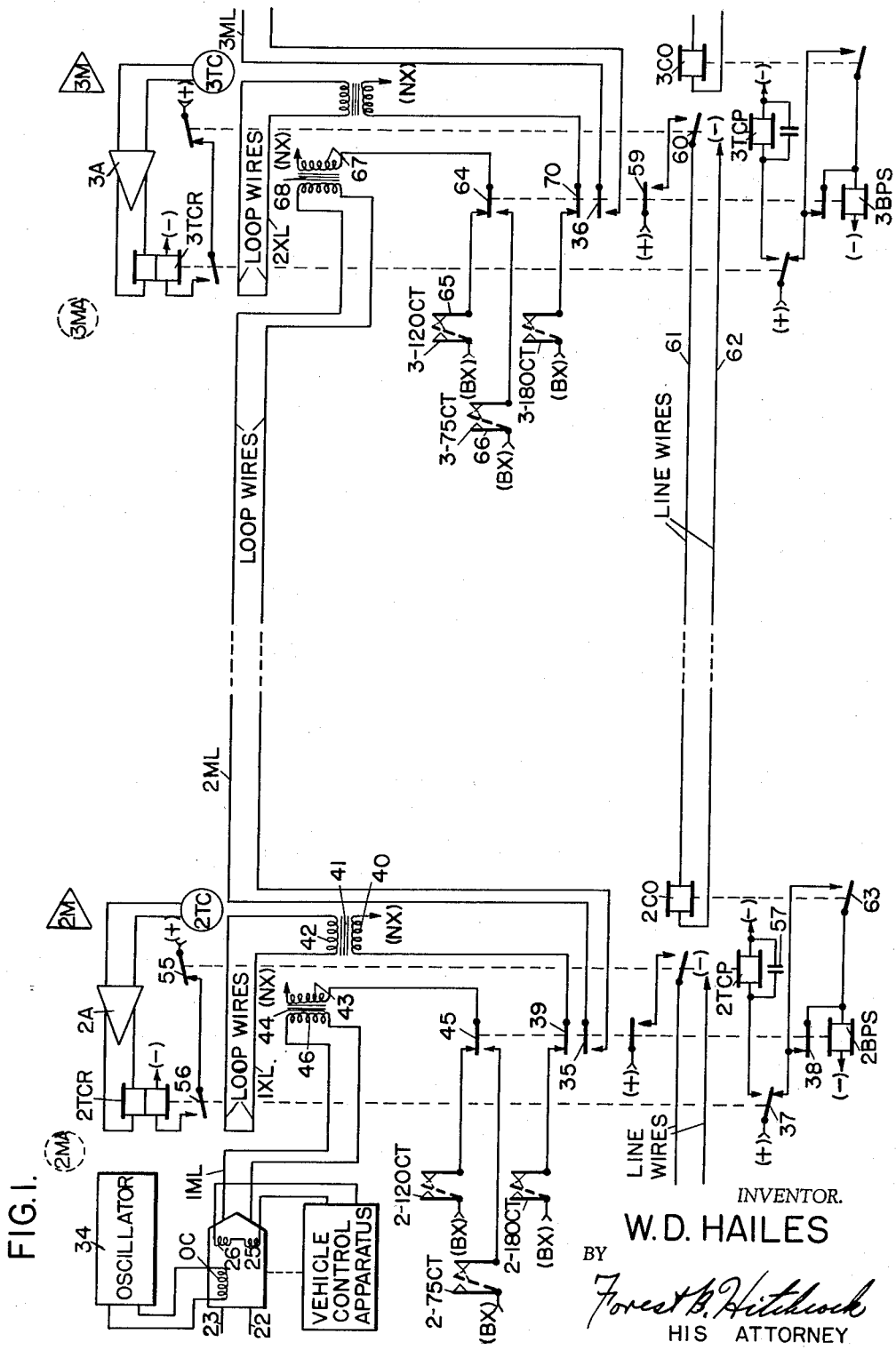
FIG. 1 illustrates loop circuits and associated control apparatus as one embodiment of the present invention for a typical block in a stretch of right of way.

The illustrations employed in the disclosure of the present invention have been arranged to facilitate the disclosure of the invention as to its mode of operation and the principles involved, rather than for the purpose of illustrating the construction and arrangement of parts that would be employed in practice. Thus, the relays and their contacts are shown in a conventional manner and conventional schematic diagrams are used. The symbols (+) and (—) have been used to identify respective, positive and negative terminals of suitable batteries or other sources of direct current, and the symbols (BX) and (NX) have been used to indicate connection to instantaneously positive and negative terminals respectively of a suitable source of alternating current for train control purposes which may be of a frequency, for example, of approximately one hundred cycles, although it is to be understood that other frequencies may be employed in accordance with the requirements of practice.

For the purpose of simplifying the disclosure of the present invention, the present invention is shown as being applied to a stretch of right of way signalled for eastbound traffic, but it is to be understood that this embodiment is just typical of different applications that may be made of the present invention.

Although one particular embodiment of the present invention is disclosed as being applied to the right of way of a monorail railroad, it is to be understood that because of the system provided by the present invention being operable independent of train shunts, that it may be employed in connection with practically any form of vehicle traffic along a right of way, irrespective of whether the vehicles are operated on track rails, rubber tired wheels, air suspension or any other type of vehicle support.

Irrespective of the type of right of way, the system according to the present invention provides for the dividing for the right of way into blocks each of which comprises a main loop circuit ML and an exit loop circuit XL. The main loop circuit is preferably long enough to provide braking distance for a vehicle for signaling systems to be most commonly encountered, and the exit loop XL being provided adjoining the main loop ML at the exit end of the block and being only of a length to insure time for relay actuation upon passage of a vehicle at its maximum speed through this loop. The limits of the blocks are conveniently marked by markers M, and additional markers MA (shown dotted) may be provided if required to mark the entrance end of the exit loops XL.

Inert tuned coils TC are provided along the right of way at the ends of the blocks for the purpose of registering the passage of vehicles. It is to be understood that the coils TC may be disposed in advance of the ends of the blocks as required in accordance with the point of location of cooperating oscillator energized coils OC on vehicles for which the train control system is provided.

Each of the tuned coils is indicated as being effective through a suitable amplifier A to provide for the actuation of an associated relay TCR for registering the passage of a vehicle having a cooperating energized coil OC.

Although it is to be understood that the vehicle carried oscillator coil OC and code receiving coils 25 and 26 may be located at any convenient place on the vehicle, the receiving coils 25 and 26 have been illustrated as being located at the front of the vehicle or train and the oscillator coil OC has been shown as being located near the rear of the vehicle. Inasmuch as the vehicle must be checked into a block before the main loop circuit ML for that block can be energized, it is desirable to locate the wayside coils TC sufficiently in the rear of the beginning of the main loops ML so that the vehicle carried oscillator will energize the wayside coils TC and thus cause the closure of the main loops ML at such a time as to provide for substantially no interruption in the reception of code on the vehicle in passing from one block to the next.

If the vehicle is a train having several cars, the location of the oscillator coil OC on the last car checks that the train is complete each time the train is checked out of one block and into the next block.

Wayside occupancy detection and coding apparatus at the adjoining ends of the blocks comprises a repeater relay TCP (see FIG. 1) which is energized through a front contact of the relay TCR at the associated location, a block stick relay BPS, a clear-out relay CO and code oscillators 75CT, 120CT and 180CT for generating time space continuous code pulses at rates of 75, 120 and 180 pulses per minute respectively. It is to be understood that different code rates and larger or smaller numbers of distinctive codes may be employed in accordance with the signaling requirements of practice.

With reference to FIG. 2, a monorail car 20 is schematically illustrated as operating on a monorail 21 with loop wires 22 and 23 extending along the right of way and positioned to cooperate with receiving coils 25 and 26 which are associated with a Vehicle Control Receiver 24 on the monorail car.

The input to the Vehicle Control Receiver 24 is provided by the train control coils 25 and 26 which cooperate inductively with the loop wires 22 and 23 respectively. It is to be understood that the loop wires 22 and 23 correspond to the wires 22 and 23 of the loop 1ML of FIG. 1.

A coding relay CR (see FIG. 3) is provided on each vehicle as is illustrated in FIG. 3 for repeating the code pulses received through coils 25 and 26, transformers 27 and 28, a suitable amplifier 4A and a full wave rectifier 29.

A relay 120R is provided on the vehicle for registration of the reception of a 120 rate code, and a relay 180R is provided for the registration of a 180 rate code. These relays are energized through suitable decoding circuits according to conventional train control practice, including relays FP and FBP, a decoding transformer 30, tuned circuits 120DU and 180DU associated with relays 120R and 180R respectively and full wave rectifiers 31 and 32 also associated with the relays 120R and 180R respectively.

A signal control stick relay FBPS is provided on the vehicle for governing the control of a suitable cab signal 33 in accordance with the particular code being received by the vehicle carried equipment. The vehicle carried equipment also includes automatic brake control means having an electropneumatic valve EPV which is operable upon deenergization to cause the application of the brakes of the vehicle. The cab signal 33 of FIG. 3 is illustrated as being of the type having individual color lamps G, Y and R providing green, yellow and red aspects, but it is to be understood that other types of signals could as well be used.

The vehicle also carries a suitable oscillator 34 which is normally effective to energize the coil OC at a predetermined frequency to which all of the track coils TC are tuned. The vehicle carried coil OC is suitably disposed on the vehicle, such as on one side of the vehicle, so as to cooperate inductively with the track coils TC which are disposed along the right of way at the locations of marker M as shown in FIG. 1.

Having thus described the apparatus for one embodiment of the present invention, detail description of the circuit organization will hereinafter be considered upon consideration of the mode of operation under certain typical operating conditions.

*Operation*

The normal conditions of the system which exist when no trains are present within the stretch of right of way illustrated in FIG. 4 are such that no code is being transmitted through the main loop circuits ML, but the exit loop circuits XL are energized by a code at a 180 rate.

With reference to FIG. 1, the main loops ML are deenergized because of being maintained open at their entering ends as the loop 2ML is open at back contact 35 of relay 2BPS. The loop 3ML is also maintained open in a similar manner by the back contact 36 of relay 3BPS being open. The relay 2BPS is normally maintained energized by a stick circuit extending from (+), including back contact 37 of relay 2TCR, front contact 38 of relay 2BPS and winding of relay 2BPS, to (−). Relay 3BPS is normally maintained picked up by a similar circuit.

The code oscillators CT are assumed to be continuously operated, although it is to be understood that they may be controlled so as to be inactive when their generated codes are not required to be applied to the loop wires. Because of the application of alternating current energy through front contact 39 of relay 2BPS at a 180 rate to the primary winding 40 of transformer 41, the exit loop 1XL is normally energized by energy induced in the secondary winding 42 of transformer 41 so that a 180 code is applied to the exit loop 1XL whenever the relay 2BPS is in its picked up position. All of the other exit loops XL are similarly controlled and thus are normally energized. The use of the transformer 41 permits the contact selections in the loop circuit to be made at relatively high voltage and low current.

The primary winding 43 of the transformer 44 which is used in feeding energy to the main loop 1ML is normally energized at a 120 code rate by alternating current applied through front contact 45 of relay 2BPS. The secondary winding 46 of transformer 44, however, is normally open circuited because the main loop 1ML is normally open at the entering end of the block similar to the manner in which the loop 2ML is open at back contact 35 of relay 2BPS. It is therefore provided that energy is applied to the wires of all of the main loops under normal conditions at the exit end of each block, but the loops are maintained open at the entering end until a train approaches.

The conditions of the train carried apparatus illustrated in FIG. 3 are the conditions which are assumed to exist when a train is occupying a main loop, with no trains in advance calling for a restrictive signal indication. Under these conditions a 120 rate code is being received by the train from the loop wires 22 and 23 (see FIG. 2), and the relay 120R is maintained picked up to register reception of the 120 code rate. The decoding relays FP and FBP are also maintained energized because of the intermittent actuation of contact 47 of the code following relay CR. Because of relay FBP being picked up the closure of its front contact 48 renders the actuation of the contact 49 of relay CR effective to energize the relay 120R through its decoding circuit including the transformer 30.

The relay 180R of FIG. 3 is illustrated in the drawings as being in its deenergized position because of the train being assumed to occupy a main loop ML, and thus the relay FBPS is normally maintained picked up through its stick circuit which extends from (+), including front contact 50 of relay FBP, front contact 51 of relay FBPS and winding of relay FBPS, to (—).

In accordance with the energized condition of the vehicle carried relays as has been described, the green lamp G of the cab signal 33 is illuminated because of the energization of a circuit extending from (+), including front contact 52 of relay FBPS, back contact 53 of relay 180R, front contact 54 of relay 120R and lamp G of signal 33, to (—).

Having thus described the normal conditions of the system as illustrated in the drawings, consideration will now be given as to the mode of operation upon passage of a train. It will thus be assumed that an eastbound train enters the block including the loop circuits 2ML and 2XL upon passing the track coil 2TC as is illustrated in the diagram of FIG. 4B.

With reference to FIG. 1, the inductive coupling of the vehicle carried oscillator coil OC with the track coil 2TC at the entrance to the block causes the picking up of the relay 2TCR by energization of its upper winding through a suitable amplifier 2A. This relay when picked up is maintained energized by a stick circuit including back contact 55 of relay 2TCP, front contact 56 of relay 2TCR and the lower winding of relay 2TCR. This stick circuit is maintained energized only for sufficient time to provide that the vehicle is checked into the block by the dropping away of the relay 2BPS. Thus the opening of back contact 37 of relay 2TCR in the stick circuit for relay 2BPS causes the relay 2BPS to become dropped away. The closure of front contact 37 of relay 2TCR establishes an obvious pick-up circuit for relay 2TCP, which in turn is effective upon picking up to open the stick circuit described for relay 2TCR at back contact 55 to cause that relay to be dropped away. Relay 2TCP is made slow to drop away because of its winding being shunted by condenser 57 to insure pick-up of clear-out relay 1CO at the block in the rear.

As soon as the vehicle is checked into the block by the dropping away of relay 2BPS, the closure of back contact 35 provides for the energization of the main loop 2ML at a 120 rate (assuming no trains in advance), and the reception on the vehicle of the 120 code is effective to maintain the green lamp G of signal 33 energized. Because of the relay FBP being maintained in its pick-up position, front contact 58 of relay FBP is maintained closed to provide energization for the brake control valve EPV. The circuit for the control of valve EPV is to be understood as including other selections as designated by "XX" in accordance with the requirements of practice. This would include selections in accordance with vehicle speed under certains, acknowledgment, etc.

As the vehicle progresses through the block so as to have its train control receiving apparatus inductively coupled with the loop wires of the exit loop 2XL, a 180 code is received on the vehicle and the relay 180R (see FIG. 3) becomes picked up and the relay 120R becomes dropped away. The green lamp G of signal 33 is energized with the relay 180R picked up by a circuit extending from (+), including front contact 52 of relay FBPS, front contact 53 of relay 180R and lamp G of signal 33, to (—). The valve EPV is maintained energized through front contact 58 of relay FBP.

When the vehicle checks into the next block by energizing the track coil 3TC from its oscillator 34, the relay 3TCR becomes momentarily picked up, and the picking up of this relay is effective to cause the dropping away of relay 3BPS in a manner comparable to that which has been described for the dropping away of the similar relay 2BPS.

With relay 3BPS in its dropped away position, at the time when the relay 3TCP is picked up, the clear-out relay 2CO at the next location in the rear is picked up by the energization of a circuit extending from (+), including back contact 59 of relay 3BPS, front contact 60 of relay 3TCP, line wire 61, winding of relay 2CO and line wire 62, to (—).

The picking up of relay 2CO causes the restoration of the relay 2BPS to its normally picked up position by the energization of a circuit extending from (+), including back contact 37 of relay 2TCR, front contact 63 of relay 2CO and winding of relay 2BPS, to (—). The picking up of relay 2BPS restores the 120 code rate to the wires feeding the loop 1ML upon the closure of its front contact 45, and it deenergizes the main loop 2ML by the opening of back contact 35. After relay 3TCP becomes dropped away, relay 2CO becomes deenergized upon the opening of front contact 60, and the dropping away of relay 2CO opens the pickup circuit for relay 2BPS at front contact 63. Relay 2BPS is maintained energized through its stick contact 38.

Having thus considered the mode of operation for a first train in checking in and out of a typical block, consideration will now be given as to the signal indications and train control provided for a following train. It will therefore be assumed that a first train has passed the marker 3M as is illustrated in the diagram of FIG. 4D, and that a following train enters the next block in the rear and passes the marker 2M. With respect to the following train, a signaling indication should be given to indicate that the block in advance is occupied, thus the yellow lamp of the cab signal 33 (see FIG. 3) is energized in accordance with the reception of a code in the main loop 2ML at a 75 rate. The code is at a 75 rate because the relay 2BPS (see FIG. 1) is in its dropped away position, and the shifting of contacts 64 of relay 3BPS has disconnected contact 65 of oscillator 3–120CT from the feed for the main loop 2ML, and has caused the loop to be fed at a 75 code rate in accordance with the actuation of contact 66 of oscillator 3–75CT, which is connected to the primary winding 67 of transformer 68 for feeding the loop circuit through back contact 64.

With reference to FIG. 3, the reception on the vehicle of the 75 rate code is registered by the relay FBP being maintained picked up, but the relays 120R and 180R are in their dropped away positions. Thus the relay FBPS is maintained picked up by energization of its stick circuit, and the yellow lamp Y of the cab signal 33 is energized by a circuit extending from (+), including front contact 52 of relay FBPS, back contact 53 of relay 180R, back contact 54 of relay 120R, front contact 69 of relay FBP and lamp Y of cab signal 33, to (—). The brake control valve EPV is maintained energized by a circuit including front contact 58 of relay FBP.

Upon observing the yellow aspect of the cab signal, the operator of the second vehicle is advised that the next block in advance is occupied, and under these conditions he should be prepared to stop at the next marker which is the marker 3M (see FIG. 1). The cab signal 33 will display a yellow aspect as long as the main loop 2ML is occupied by the vehicle, but if the vehicle enters the exit loop 2XL, the signal aspect is changed from yellow to red. This is because energy is removed by front contact 70 of relay 3BPS from the feed for the exit loop 2XL when the block in advance of marker 3M is occupied. Under these conditions, with reference to FIG. 3, the code following relay CR on the second vehicle becomes inactive, and thus the relays FP and FBP become dropped away. The dropping away of relay FBP causes the dropping away of relay FBPS by opening its circuit at front contact 50 and the opening of front contact 52 of relay BPS opens the circuit that has been described for the energization of the yellow lamp Y of cab signal 33. The red lamp R of cab signal 33 becomes energized through back contact 52 of relay FBPS.

If the marker 3M is considered comparable to an "absolute" signal in that the second vehicle must not enter the block while it is occupied by a preceding vehicle, the second vehicle must wait until the block in advance becomes unoccupied, at which time the relay 3BPS will become picked up to establish coding at a 180 rate in the exit loop 2XL and thus cause the relay 180R on the vehicle to become picked up to close a pick-up circuit for the relay FBPS through its front contact 71. Relay FBPS when picked up opens the circuit for the red lamp of the cab signal 33 at back contact 52 and closes a circuit that has been described for the energization of the green lamp G of cab signal 33. Thus the second vehicle can now proceed, and upon passing the marker 3M, a 75 code rate in the loop 3ML is effective to change the signal aspect from green to yellow.

Another condition for providing signal indications for a following vehicle may be where the marker 3M, for example, is assumed to be a "permissive" marker in that the second vehicle is permitted to enter the block in advance before the first vehicle has vacated that block. Under these conditions, both vehicles can receive energy from the main loop 3ML. It is, however, improper to provide the second train with a signal aspect other than red, because, with a preceding vehicle in the block, the second vehicle must proceed to flag through the block at low speed.

The second vehicle is made nonresponsive to the code transmitted in the main loop 3ML under these conditions for controlling the cab signal 33 because the relay FBPS on the vehicle has been dropped away due to there being no code transmitted in the exit loop 2XL. Thus the relay FBPS applies energy through its front contact 52 to the red lamp R of cab signal 33, even though the relay 120R is picked up to register a 120 code as being received in the main loop 3ML. This particular feature of the system will be recognized as being materially different than the mode of operation where railway track circuits are employed in that the first vehicle does nothing to shunt the loop as it would shunt a track circuit to prevent train control energy from the being received by the second train in the same block. It is therefore necessary that circuit means be provided, as is accomplished by the use of the exit loops and by the stick relays FBPS, to render the signaling means for the second vehicle nonresponsive to the loop circuits. This condition of where the restrictive indication is provided for the second vehicle is maintained effective until the second vehicle proceeds to the end of the block so as to occupy the exit loop XL for that block, and the second vehicle must remain on this loop until the block in advance becomes unoccupied so as to permit the relay FBPS to become picked up upon the reception of a 180 rate code. It will therefore be seen that the exit loops XL serve as a means for preventing a second vehicle entering an occupied block from being controlled in accordance with the code in the main loop circuit, and it also serves as a means for resetting the train control and cab signal control apparatus after it has been rendered nonresponsive to the loop circuit code as has been heretofore described.

Although all of the circuits which would normally be provided for train control have not been shown, it is to be understood that the system of train control can be provided according to the usual practice wherein a vehicle driven speed contactor is employed in the control of the valve EPV, and the usual system of acknowledgement is used in cooperation with the speed contactor to permit operation of the vehicle after acknowledgement at reduced speed upon reception of a 75 rate code.

Under conditions where the red lamp R of the cab signal 33 is illuminated, according to usual train control practice, the valve EPV becomes deenergized, and there is an automatic application of the brakes. This is the mode of operation that is effective when a vehicle enters an exit loop XL which is deenergized, such as the condition that has been described when considering the passage of a following vehicle in approaching an occupied block. Therefore, to avoid a penalty of an automatic application of the brakes, and the necessity for resetting the brake control apparatus, the operator of a vehicle when operating under a yellow signal aspect should stop short of the exit loop for the block in which the vehicle is traveling at the marker MA, and wait for the cab signal to change from yellow to green. If this vehicle plans on entering the block ahead, however, when such block is occupied as has been heretofore described, it will be necessary that the vehicle enter the exit loop and receive an automatic brake application, after which the brake control apparatus can be reset manually by the actuation of a suitable reset button which is effective to cause the energization of the valve EPV to permit release of the brakes. Under these conditions, the valve EPV is maintained energized only so long as the vehicle proceeds at reduced speed as is indicated by the vehicle speed contactor.

Figure 6:
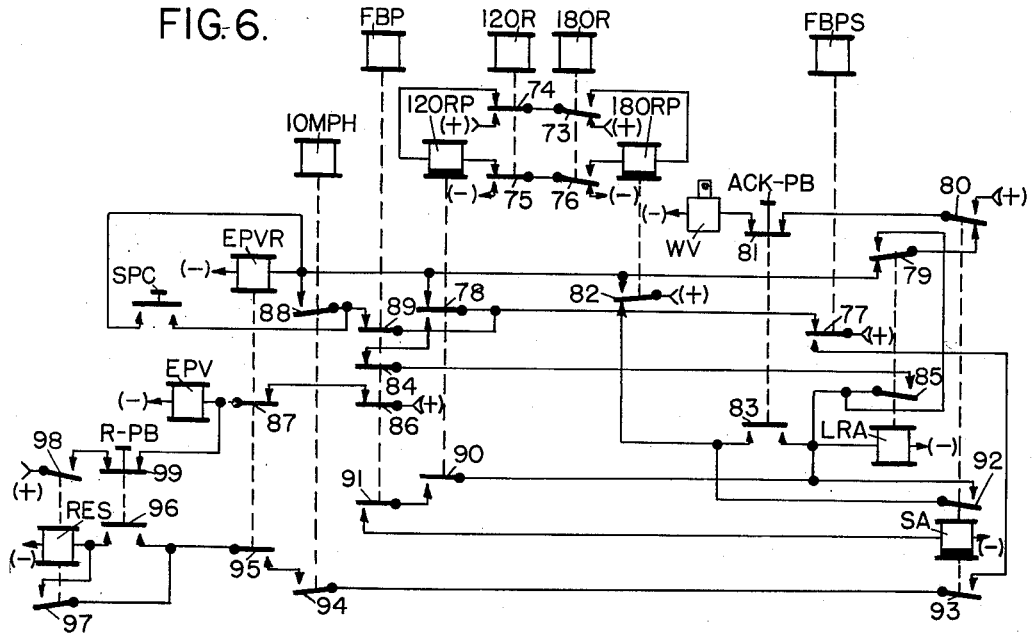
FIG. 6 illustrates detail circuits of typical train control apparatus.

With reference to FIG. 6, a specific circuit organization is illustrated for controlling the electropneumatic valve EPV of FIG. 3, and thus for controlling the brakes of a vehicle. It is to be understood that the relays illustrated in block form in FIG. 6 are controlled as is illustrated for corresponding relays of FIG. 3, and that the valve EPV of FIG. 6 corresponds to the valve EPV of FIG. 3.

Code receiving repeater relays 120RP and 180RP which are employed in FIG. 6 are slow drop-away relays provided for the purpose of insuring that there is no interruption in control upon passage of the vehicle from one control loop to another wherein there is a change in the code rate received. Relay 120RP is energized by a circuit extending from (+), including back contact 73 of relay 180R, front contact 74 of relay 120R, winding of relay 120RP, front contact 75 of relay 120R and back contact 76 of relay 180R, to (—). The relay 180RP is energized in a similar manner except that it is subject to energization through front contacts 73 and 76 of relay 180R and through back contacts 74 and 75 of relay 120R. Relays 120RP and 180RP may also be used to control the cab signal 33 of FIG. 3, rather than having the cab signal 33 controlled by contacts of the relays 120R and 180R directly.

According to FIG. 6 a whistle valve WV is normally energized, and upon its deenergization actuates a whistle or other alarm device on the vehicle. Relays LRA and SA are provided for control of the whistle valve WV, and a suitable manually operable contactor ACK-PB is provided for acknowledgement purposes. A relay EPVR is provided for use in controlling the electropneumatic valve EPV, and a reset push button R-PB is provided together with a reset relay RES for use in resetting the train control apparatus after the vehicle has been brought to stop by an automatic brake application.

If the cab signal 33 of FIG. 3 changes from green to yellow when a vehicle has occupied a main loop ML, relays 120R and 180R are both deenergized, and thus their repeater relays 120RP and 180RP are both in their dropped away positions, but the relays FBP and FBPS are maintained energized because of the 75 rate code being received. Under these conditions the whistle valve WV is deenergized to call the attention of the operator of the vehicle to the change in signal aspect. This valve is illustrated as being normally energized by a circuit extending from (+), including front contact 77 of relay FBPS, front contact 78 of relay 120RP, back contact 79 of relay LRA, back contact 80 of relay SA, normally closed contact 81 of the acknowledging push button ACK–PB and winding of whistle valve WV, to (−). It will be readily apparent that the whistle valve WV is subject to energization in a similar manner through front contact 82 of relay 180RP when the vehicle is receiving from an exit loop XL. Thus the whistle valve WV is deenergized by front contacts 82 and 78 of relays 180RP and 120RP being both open after the signal aspect is changed as described above.

If the acknowledging push button ACK–PB is actuated by the operator, the relay LRA becomes picked up by the energization of a circuit including back contact 82 of relay 180RP and contact 83 of acknowledging push button ACK–PB. Relay LRA when picked up is maintained energized by a circuit extending from (+), including front contact 77 of relay FBPS, back contact 78 of relay 120RP, front contact 84 of relay FBP, front contact 85 of relay LRA, and winding of relay LRA, to (−). Relay LRA when picked up closes a circuit for reenergization of the whistle valve WV after resoration of the acknowledgement push button ACK–PB to its normal position. The circuit by which the valve WV is energized under these conditions extends from (+), including front contact 77 of relay FBPS, back contact 78 of relay 120RP, front contact 84 of relay FBP, front contact 85 of relay LRA, front contact 79 of relay LRA, back contact 80 of relay SA and winding of valve WV, to (−).

The relay EPVR is energized normally, when there is no train in advance, through the front contacts 78 and 82 when occupying respectively a main loop ML or an exit loop XL. In accordance with the relay EPVR being maintained picked up, the valve EPV is normally energized through front contact 86 of relay FBP and front contact 87 of relay EPVR.

When the signal aspect changes from green to yellow, and acknowledgement has been made, the relay EPVR is maintained energized by a new circuit, dependent upon the closure of front contact 88 of a suitable vehicle driven speed contactor 10MPH, wherein this contact is closed only for speeds below a particular speed such as 10 miles per hour. The circuit by which the relay EPVR is energized under these conditions includes front contact 77 of relay FBPS, front contact 89 of relay FBP and front contact 88 of speed contact 10MPH. A suppression contactor SPC is connected in multiple with front contact 88 in the circuit for relay EPVR whereby an automatic application of the brakes may be suppressed during the time required to reduce the speed of the vehicle to a point where the contact 10MPH will close its contacts. Should the operator of the vehicle take no action, such as to actuate the suppression contact SPC upon receiving a restricted signal, when the train is traveling above 10 MPH, the relay EPVR obviously becomes dropped away, and the opening of its front contact 87 causes the valve EPV to be actuated to cause application of the brakes of the vehicle.

After automatic application of the brakes of a vehicle, the brakes will be maintained applied until the speed is reduced sufficiently to close the speed contactor 10MPH (assuming a 75 rate code is being received from a main loop ML). At this time the relay EPVR becomes energized through front contact 88 of contactor 10MPH by a circuit that has been described. The closure of front contact 87 of relay EPVR causes energization of the valve EPV, and thus releases the brakes of the vehicle.

If the vehicle receives no code in an exit loop, the relays FBP, FBPS, 120RP and 180RP are all in their deenergized positions, the whistle valve WV becomes deenergized. Acknowledgement picks up the relays LRA and SA and reenergizes the whistle valve WV. Relay SA is energized under these conditions by a circuit extending from (+), including back contact 82 of relay 180RP, contact 83 of acknowledgement push button ACK–PB, back contact 90 of relay 120RP, back contact 91 of relay FBP and winding of relay SA, to (−). This relay when picked up is maintained energized through its front contact 92 which is connected in multiple with contact 83 of the acknowledgement push button ACK–PB. The closure of front contact 80 of relay SA provides energization for the whistle valve WV upon restoration of the acknowledgement push button ACK–PB to its normal position.

A reset of the train control apparatus is required after the vehicle has been brought to a stop by actuation of a suitable reset push button R–PB. Upon actuation of this button, a reset relay RES is picked up by the energization of a circuit extending from (+), including back contact 77 of relay FBPS, front contact 93 of relay SA, front contact 94 of speed contactor 10MPH, back contact 95 of relay EPVR, contact 96 of reset push button R–PB and winding of relay RES, to (−). The picking up of this relay closes a stick circuit at front contact 97 to shunt contact 96 out of the circuit just described. The picking up of the relay RES provides for the energization of the valve EPV when the push button R–PB is restored to its normal position. Valve EPV is energized by a circuit including front contact 98 of relay RES and normally closed contact 99 of push button R–PB. From the circuit organization just described, it will be readily apparent that the brakes of the vehicle are released, and the vehicle will be permitted to proceed at low speed as governed by the contact 94 of the speed contactor 10MPH in the circuit for the reset relay RES. If this speed is violated, another application of the brakes will be applied.

Figure 7:
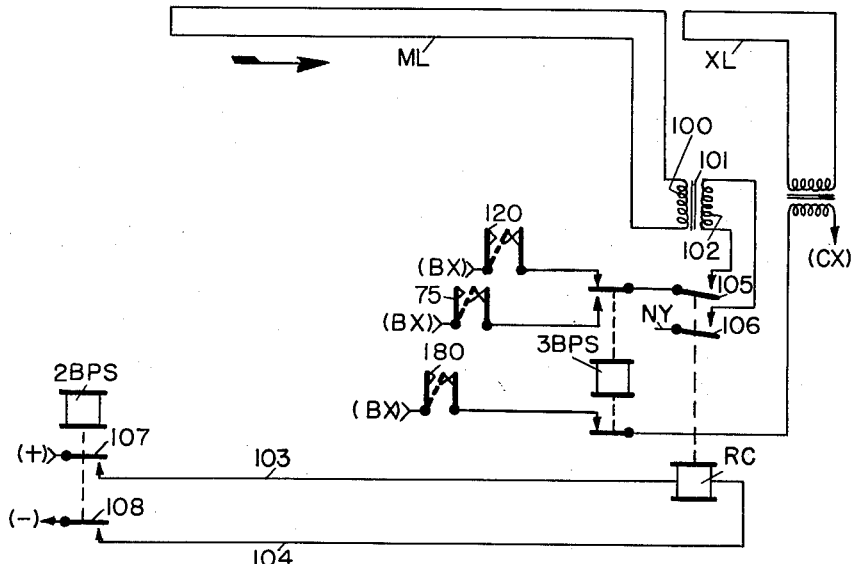
FIG. 7 illustrates a modified form of control for a main loop circuit.

FIG. 7 illustrates a modified form of control for a main loop such as the typical loop 2ML1, wherein the relays 2BPS and 3BPS are assumed to be controlled as is shown in FIG. 1. The loop circuit for loop 2ML1 of FIG. 7 differs from the loop circuit 2ML of FIG. 1 in that the circuit including the secondary winding 100 of transformer 101 is always maintained closed, and the control of energization of the loop 2ML1 in accordance with the condition of the relay 2BPS at the entering end of the block is provided in the control of energization of the primary winding 102 of transformer 101, rather than the relay 2BPS being effective to open the loop 2ML directly as is illustrated in FIG. 1. This circuit organization requires additional line wires 103 and 104, but it has the advantage of providing for greater safety by guarding against short circuits in the loop, and in selecting the energization of the main loop through front contacts 105 and 106 in a relatively high voltage circuit for energizing the primary winding 102 of transformer 101. The relay RC becomes a back contact repeater of the relay 2BPS in that it is energized through back contacts 107 and 108 of relay 2BPS.

From the mode of operation of the system as described, it will be readily apparent that the system is fail-safe in that a vehicle must properly check into each block by energization of a track coil TC from its oscillator and thereby cause occupancy relay BPS to be released before that vehicle can receive code. Thus, if a vehicle fails to check into a block, no code is received from the main loop ML of that block, and the valve EPV is deenergized to apply the brakes to stop the vehicle. The cab signal 33 of course displays a red aspect at this time.

The failure of a vehicle to properly check into a block as described above is also effective to provide rear end protection because the failure to check into a block also prevents the vehicle from checking out of the preceding block, thereby causing the code control apparatus to be conditioned as if the vehicle had never left the preceding block, and causing the display of a yellow aspect for a second train within the main loop ML of the second block in the rear of the first train, and no code in the XL loop of the second block in the rear which will change the cab signal to red and stop the train with an automatic application of the brakes if the train moves beyond the end of the ML loop into the XL loop.

Having thus described a cab signaling and vehicle control system as one embodiment of the present invention, it is to be understood that other forms of the invention may be employed in accordance with the requirements of practice and that adaptations, alterations and modifications may be applied to the specific forms shown in accordance with the invention as defined by the appending claims.

What I claim is:

1. A vehicle control system for governing the passage of a vehicle along a right of way without track circuits divided into successive blocks comprising, tuned coils at the ends of the blocks, loop circuit means for the several blocks extending along the right of way substantially throughout the entire length of the associated blocks for transmitting selected codes to vehicles within the associated blocks, circuit means responsive to the passage of a vehicle past one of said tuned coils for energizing said loop circuit means for the block in advance of the vehicle with a character of energization selected in accordance with traffic conditions in advance of the vehicle, and vehicle carried means distinctively responsible to the character of energization of the loops as the vehicle progresses for registering the condition of occupancy of the right of way in advance of the vehicle.

2. A vehicle control system according to claim 1 wherein a loop circuit for a given block is energized when the vehicle enters that block in response to electrical communication at a given frequency between vehicle carried apparatus and said tuned coil at the entering end of the associated block.

3. A vehicle control system according to claim 1 wherein the loop circuit for each block is normally open at the entering end of the associated block and is normally energized at the leaving end of the associated block.

4. A vehicle control system according to claim 1 wherein the loop circuits are normally closed at the entering end of the associated blocks and energization is rendered effective at the exit ends of the associated blocks when the associated block is entered by a vehicle.

5. In a vehicle control system for governing the passage of a vehicle along a right of way without track circuits divided into successive blocks, means for transmitting energy of a distinctive character from a vehicle traveling along the right of way, occupancy registering means including wayside receivers at the ends of the blocks responsive when said vehicle passes the receivers respectively to energy transmitted from the vehicle for registering occupancy of the vehicle in the block just entered and for cancelling occupancy registered for the block just vacated, indicating means on said vehicle, and continuous code communication means including at least one conductor extending along said right of way and vehicle carried receiving apparatus for distinctively conditioning said indication means in accordance with the condition of occupancy as registered by said occupancy registering means of the right of way in advance of the vehicle.

6. A vehicle control system according to claim 5 wherein said distinctive energization is alternating current generated by a vehicle carried oscillator at a predetermined frequency.

7. A vehicle control system according to claim 5 wherein said wayside receivers are inert tuned coils.

8. A vehicle control system according to claim 5 wherein the indication means on said vehicle includes a cab signal having distinctive color light aspects for indicating conditions of occupancy of the right of way in advance of the vehicle.

9. A vehicle control system comprising, a right of way for vehicle traffic divided into successive blocks, receiving means at the ends of the blocks for detecting passage of a vehicle, said means including a relay actuated upon passage of the vehicle, registering means at the ends of the blocks responsive to said receiving means at the associated locations for registering occupancy of the block just entered by a vehicle, loop circuit means for each of the blocks for transmitting selected control codes to the vehicle upon its passage over at least one conductor of the loops along said right of way, said loop circuit means for each block including a main loop and a relatively short loop, said loop circuit means being effective to transmit no code in said short loop if the next following main loop is occupied by a vehicle, vehicle carried code receiving means distinctively responsive to the codes transmitted by the main and short loops for registering the code received, and control means on said vehicle actuated in accordance with the code received from said main loop for registering a proceed indication, said control means being rendered ineffective to register a proceed indication, irrespective of the code received from a main loop provided that the preceding short loop was deenergized when the associated vehicle passed over it.

10. A vehicle control system according to claim 9 wherein in two distinctive codes are selectively transmitted through the main loops in accordance with the condition of occupancy of the next block in advance.

11. A vehicle control system according to claim 9 wherein the short loops are at the exit ends of the blocks for a given direction of traffic.

12. A vehicle control system according to claim 9 wherein said control means on the vehicle governs automatic brake control means for selectively governing the automatic application of the brakes of the vehicle.

13. A vehicle control system according to claim 12 wherein the brake control apparatus includes acknowledging means for acknowledging a restrictive signal indication.

14. A vehicle control system according to claim 12 wherein the brake control means includes reset means for releasing the brakes of the vehicle after an automatic brake application.

References Cited in the file of this patent

UNITED STATES PATENTS

| | | |
|---|---|---|
| 2,030,924 | Kemmerer | Feb. 18, 1936 |
| 2,061,027 | Espenschied et al. | Nov. 17, 1936 |
| 2,462,454 | Allison | Feb. 22, 1949 |
| 2,488,815 | Hailes | Nov. 22, 1949 |
| 2,499,177 | Baughman | Feb. 28, 1950 |
| 2,555,013 | Staples | May 29, 1951 |
| 2,588,005 | Howard | Mar. 4, 1952 |
| 2,632,844 | Hughson | Mar. 24, 1953 |
| 2,731,550 | Stafford | Jan. 17, 1956 |